(12) United States Patent
Monforte Duart

(10) Patent No.: US 10,349,771 B2
(45) Date of Patent: Jul. 16, 2019

(54) DEVICE FOR BEVERAGE PRODUCTION

(71) Applicant: Andoni Monforte Duart, Alboraya (ES)

(72) Inventor: Andoni Monforte Duart, Alboraya (ES)

(*) Notice: Subject to any disclaimer, the term of this patent is extended or adjusted under 35 U.S.C. 154(b) by 998 days.

(21) Appl. No.: 14/377,943

(22) PCT Filed: Feb. 11, 2013

(86) PCT No.: PCT/EP2013/052709
§ 371 (c)(1),
(2) Date: Aug. 11, 2014

(87) PCT Pub. No.: WO2013/120813
PCT Pub. Date: Aug. 22, 2013

(65) Prior Publication Data
US 2015/0028140 A1    Jan. 29, 2015

(30) Foreign Application Priority Data

Feb. 15, 2012  (ES) .............................. 201230163 U

(51) Int. Cl.
*A47J 19/02* (2006.01)
*A47J 19/00* (2006.01)
*A47J 19/04* (2006.01)

(52) U.S. Cl.
CPC .......... *A47J 19/022* (2013.01); *A47J 19/005* (2013.01); *A47J 19/04* (2013.01)

(58) Field of Classification Search
CPC ......... A47J 19/005; A47J 19/022; A47J 19/04

USPC ........ 241/69, 185.6, 98, 278.1; 99/513, 509, 99/510, 297, 302 P, 317, 318, 322; 210/238, 413, 473, 474, 497.01

See application file for complete search history.

(56) References Cited

U.S. PATENT DOCUMENTS 6,135,019 A     10/2000  Chou
6,968,777 B2*  11/2005  Lin ....................... A47J 19/027
                                                                   99/511

(Continued)

FOREIGN PATENT DOCUMENTS

DE      8904735     6/1989
FR       579466     10/1924

(Continued)

OTHER PUBLICATIONS

Written Opinions of the International Preliminary Examining Authority and International Searching Authority in PCT/EP2013/052709, dated Feb. 10, 2014 and Jul. 1, 2013.

(Continued)

*Primary Examiner* — Dana Ross
*Assistant Examiner* — Ket D Dang
(74) *Attorney, Agent, or Firm* — Vedder Price PC

(57) ABSTRACT

Described is a device for producing beverages, compatible with any handheld domestic blender, which enables producing beverages either by crushing a solid element from which the juice is extracted and at the same time filtering the same or, enabling mixing a solid element with a liquid one at the same time that it is being filtered, the device including at least one filtering beaker, a pestle for inserting into the filtering beaker, and structure for holding the filtering beaker.

19 Claims, 2 Drawing Sheets

(56) References Cited

U.S. PATENT DOCUMENTS

| | | | |
|---|---|---|---|
| 2005/0068847 A1* | 3/2005 | Sands | A47J 19/027 366/205 |
| 2005/0199129 A1* | 9/2005 | Glucksman | A47J 31/20 99/279 |
| 2006/0124536 A1 | 6/2006 | Guerrero | |
| 2007/0193452 A1* | 8/2007 | Campetella | A47J 31/42 99/279 |
| 2008/0314261 A1* | 12/2008 | Hensel | A47J 19/027 99/511 |
| 2009/0229472 A1* | 9/2009 | Ferrara, Jr. | A47J 31/005 99/323 |
| 2010/0224078 A1* | 9/2010 | Khalifa | A47J 31/20 99/323 |
| 2011/0185921 A1* | 8/2011 | Lee | A23N 1/00 99/513 |
| 2012/0305685 A1* | 12/2012 | Yamamoto | B02C 19/08 241/24.1 |

FOREIGN PATENT DOCUMENTS

| | | |
|---|---|---|
| FR | 1144139 | 10/1957 |
| WO | 2009098368 | 8/2009 |

OTHER PUBLICATIONS

International Preliminary Report on Patentability in PCT/EP2013/052709, dated Jun. 3, 2014.

\* cited by examiner

DEVICE FOR BEVERAGE PRODUCTION

CROSS REFERENCE TO RELATED APPLICATIONS

This application is a United States national-phase application pursuant to 35 U.S.C. § 371, claiming benefit of international PCT Application No. PCT/EP2013/052709, titled "DEVICE FOR BEVERAGE PRODUCTION" that was filed Feb. 11, 2013, which claims the benefit of Spanish Patent Application No. 201230163 U, filed Feb. 15, 2012. The disclosures of application serial numbers PCT/EP2013/052709 and 201230163 U are incorporated by reference herein in their entirety.

The present invention, as its name indicates, relates to a device for producing beverages, compatible with any domestic hand-held blender of those known to exist in the market, which enables preparing beverages either by crushing a solid from which the juice is extracted and filtered at the same time, or allowing the mixture of a solid and a liquid while the filtering is taking place.

The sector of the art to which it pertains is that of kitchen tools.

BACKGROUND OF THE INVENTION

Multiple kitchen tools are known, many of them small electrical appliances for the purpose of producing beverages, in particular juices or fruit extracts.

There are known squeezers and liquefiers for which there is a widely known body of patent and market literature.

Squeezers for domestic use normally comprise a recipient inside of which there is a juicing cone that normally rotates, against which the fruit is extracted by force while the juice falls by gravity through a filter that may be on the base of the recipient.

Liquefiers relate in general to devices comprising a recipient on the base of which there are slicing or crushing elements so that after the fruit is crushed centrifugal filtering takes place through the action of a perimeter filter.

Liquefiers also relate to electrical appliances comprising a jar-shaped beaker on the base of which there are rotating blades that crush everything introduced into the beaker, the resulting mix being then filtered by the user.

Recently some tubular-shaped devices have been developed for this type of liquefier, which incorporate filtration elements and are attached to the perimeter area so that when said tubes fill up with the product, a fruit for example, the rotating blades crush it and it would be then filtered through the filtering elements of said tubes by centrifuging.

Patent WO2009/098368 is an example of the above, as its object comprises a tubular element appropriate for insertion into a liquefier of the aforementioned type inside of which a filtering element is located.

Patent US2006/0124536 likewise relates to a tubular object appropriate for being inserted into a liquefier of the beaker type with blades on the base, said tube having perforations on its sides, with the jar divided into two cavities, one internal influenced by blades, and the other outside of said tube.

U.S. Pat. No. 6,135,019 likewise relates to a tubular filter appropriate for being attached to a liquefier of the beaker type with blades on the base that establish a cavity in which the blades act, and an outer cavity.

All of these patents are based on a tubular element having open top and bottom portions so that, if the tube is removed after crushing, the remnants of the crushed fruit would be splattered in the juice, which would render the filtering performed useless.

Consequently the beverage produced must be served from the tube and, therefore, the crushed remnants are still inside the liquefier, creating the risk of spillage or dripping when pouring.

Another drawback of this system is that there is no way of compacting the crushed remnants so as to be able to completely extract the juice from a fruit and, even though sticks or spoons may be inserted, the presence of the blades interferes with the pressing operation and, furthermore, since the remnants cannot be removed, a remnant will always be left at the bottom and there will not be any other way to extract the remaining juice.

Furthermore, given that the tube of the described patents must be left fixed to the base of the liquefier and there are different models, different tubes will likewise be needed, that will require preparing more moulds, with the resulting cost increase, and be a drawback for the user who, when changing liquefiers, should also change this accessory.

DESCRIPTION OF THE INVENTION

To remedy the described problems, a device is proposed for producing beverages that is appropriate for use with any hand-held blender of the type that comprises a body with a motor and an extension or bar which is fitted at its end with an actuating head that integrates rotating blades.

The proposed invention comprises:

A filtering beaker

Means for holding the filtering beaker

A pestle appropriate to be inserted in the filtering beaker

In order to use the device, the filtering beaker must be inserted into a containing beaker which, in a preferred embodiment, must have a suitable size and shape so that the filtering beaker can be fixed in this containing beaker and that the turbulences created by the blender cause the desired effect. However, the essential part comprises the filtering beaker having means to be held, and the pestle.

The containing beaker will carry out the functions of the recipient, while the entire process of production is carried out inside it.

The filtering beaker is inserted into and fixed to the containing beaker.

The fixing means may be multiple, although in the tests carried out means that fix both the top portion and the bottom portion of the beaker have been shown to provide a suitable result.

In one of the possible embodiments, both beakers may be joined at their base in a permanent manner, though this does not suitably resolve the previously described problems with regard to pouring the beverage obtained without previously having been able to remove the remnants from the interior of the filtering beaker. It would, nevertheless, fall within the scope of protection of the present invention.

The filtering beaker is equipped with elements on its top mouth for fixing it to the containing beaker.

In a preferred embodiment, it is anticipated that the filtering beaker will incorporate a rim that covers the mouth of the containing beaker and is fixed to it by the geometry of its design, with the further possibility of adding elements for clipping, pinching, or any other type, if necessary, even though the fixing elements can be found on the filtering beaker, the containing beaker or on both, each being complements for the others.

Given that according to the described embodiment, the filtering beaker itself is wider at its top portion to the point of reaching and covering the rim of the containing beaker, the geometry of the filtering beaker itself configures a lid to avoid splattering.

To avoid vibrations in the filtering beaker, it is also advisable to equip the device with additional fastening means on the base of the beaker.

As a result of the tests carried out, a simple fastening shape that is easily cleaned has been chosen, such as including a recess on the bottom of the containing beaker having a suitable shape and size to accommodate the base of the filtering beaker without gaps.

The filtering beaker displays a series of filtering areas, either by means of pores on the body of the beaker itself, mesh windows, or any other system that enables filtering.

The filtering beaker may have filtering areas both on its side and on its base, in which case it is advantageous for the lateral filtering areas to extend from the bottom end of the filtering beaker to its mouth.

Finally, a suitable pestle is provided for inserting into the filtering beaker. Said pestle has both an ascending and descending motion and preferably also rotates on its vertical axis.

The diameter of the filtering beaker must be sufficient to enable the introduction of a domestic blender, for which purpose the interior diameter of the filtering beaker should range between 6 and 12 centimeters or, for a wider shape, between 4 and 15 centimeters.

The diameter of the containing beaker, which is larger than the filtering beaker, should be sufficient so that the configuration leaves a free space between the walls of the two beakers.

Thus, the device is configured to actuate in the following manner.

The ingredient that is desired for the production of the beverage is put into the filtering beaker, and may be fruit, tiger nut, assorted nuts, or any other ingredient that it is deemed possible to put into the beaker, either whole or previously crushed or ground, such as tiger nut flour.

If necessary, for example, when preparing to make tiger nut milk (horchata) based on—tiger nut flour, water may be placed in the containing base. Other liquids may be used to make the desired beverage if necessary, for example, milk to make fruit shakes.

Once the device is assembled and the filtering beaker fixed to the containing beaker, a blender is introduced into the filtering beaker.

The blender will crush and/or remove the content of the filtering beaker, and so, if diced fruit has been introduced, the blender will crush the fruit, causing the filtered juice to exit towards the containing beaker by centrifuging. However, if tiger nut flour has been placed in the filtering beaker and water in the containing beaker, the blender will create the necessary turbulences so that the water is forced to enter the filtering beaker through the filtering areas, where it mixes with the tiger nut flour and extracts the desired elements by dilution, after which it exits another time by crossing the filtering areas again, but leaving the residual tiger nut flour grains inside the filtering beaker.

After the crushing and/or mixing operation is finished, the blender is removed and the pestle is introduced so that, in a preferred embodiment, it occupies the inside part of the filtering beaker at least to the height where the filtering areas reach. Conversely, it can also have a piston shape having diameter that coincides with the inner diameter of the filtering beaker.

The term "pestle" in the present document and claims shall refer to any piece that is displaced in an up or down motion inside the filtering beaker and that completely occupies the cross-section of said beaker so that, on descent, it drags the solid remnants and traps them against the base of the filtering beaker, including in this concept an embodiment of the pestle which incorporates a filter so that it drags and compacts the solid remnants but allows the liquid to pass.

Optionally the pestle may have an o-ring on its perimeter to improve the fit between the beaker and the pestle.

The pestle will put pressure on the remnants inside the filtering beaker, thus drying them and extracting all of the juice of the piece that has been used as raw material.

In a preferred version, the pestle is compact and occupies the interior of the filtering beaker at least up to the point to where the filtering areas reach, so as to avoid the liquid being displaced to the outside of the filtering beaker due to the action of the pestle and it re-entering at a higher position. Nevertheless, the pestle can have a different shape, for example, a piston shape incorporating a filter in such a way that the liquid would pass through the pestle occupying the filtering beaker and leaving the solids compacted.

Given that a preferred embodiment of the filtering beaker also has a filtering area at its base, the action of the pestle will be more effective when the base of the filtering beaker remains above the surface of the liquid existing in the containing beaker, in which moment it will be possible to press down so as to compact and dry the remnant in the filtering beaker to the maximum.

In this regard, means may be incorporated to the device to fix the filtering beaker at different heights within the containing beaker.

To carry out these operations, it is best for the pestle to be able to move freely inside the filtering beaker, both when ascending and descending, and when rotating on its axis.

The device may incorporate different functional elements such as:

A top for closing the containing beaker after the filtering beaker has been removed, making it possible to conserve the obtained beverage for a longer amount of time.

An outer handle on the containing beaker to facilitate support operations while elaborating or pouring to serve the beverage, for example.

DESCRIPTION OF AN EMBODIMENT OF THE INVENTION

Figure 1:
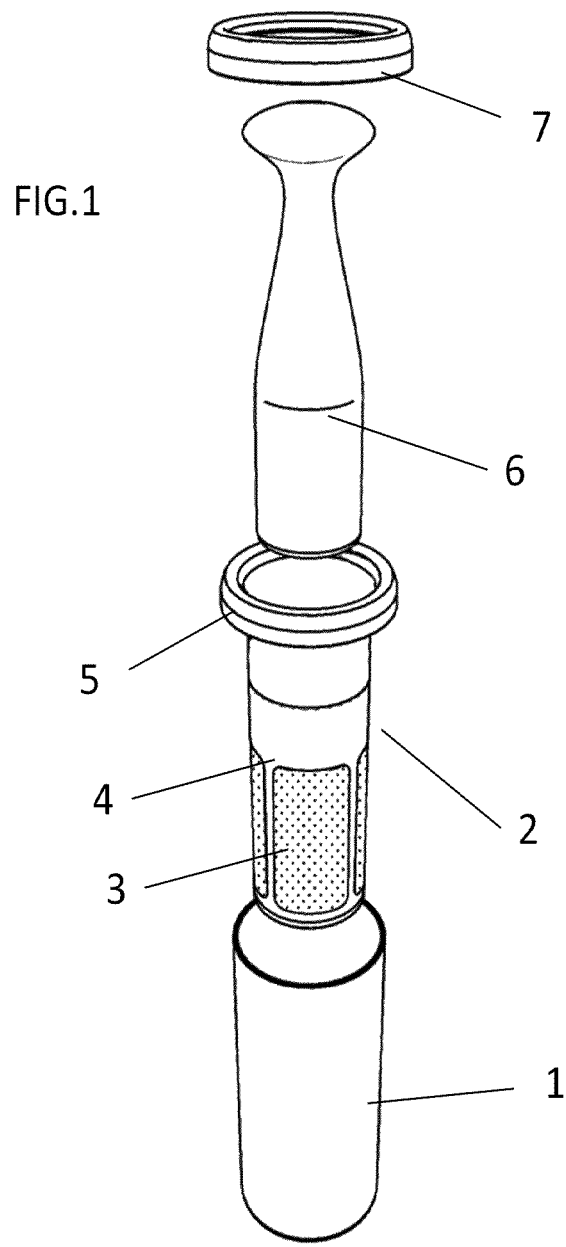
FIG. 1 shows an exploded view of the different elements that comprise the device, thus displaying containing beaker (1), filtering beaker (2), on which are visible filtering areas (3), beaker body (4), the widened top area with rim (5), pestle (6) and top (7).
Figure 2:
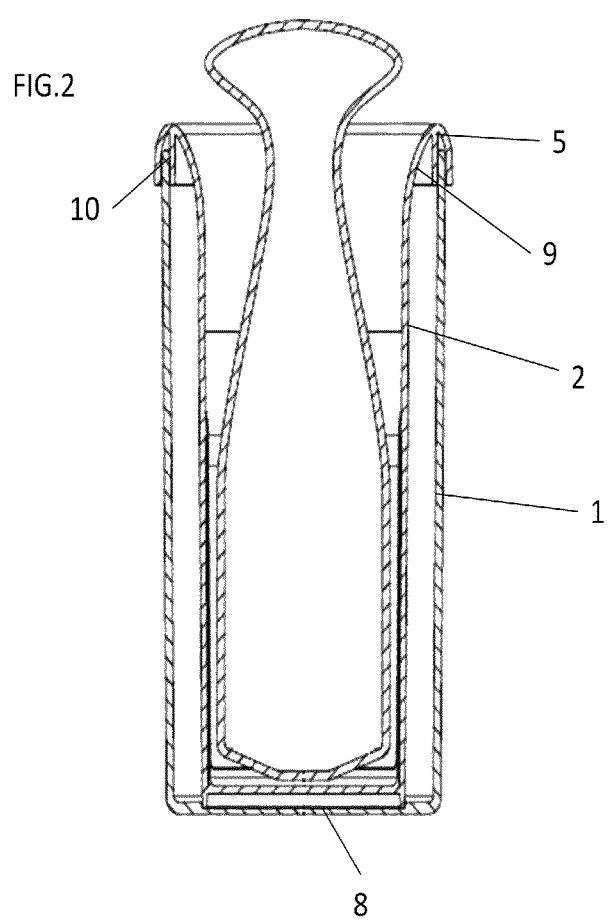
FIG. 2 shows a cross-section of the assembled device in which are visible containing beaker (1) having a recess on bottom (8) capable of lodging the base of filtering beaker (2), filtering beaker widening (9) and rim (5) that comprises inner bead (10) suitably adjusted to the mouth of the containing beaker and pestle (6), in this case in an embodiment having the shape of a mortar pestle.

The invention as described is limited to demonstrating a manner of embodiment without permitting it to be understood as limiting the technical content of the present document.

The device for beverage production comprises:

Containing beaker (1)

Filtering beaker (2), having a smaller diameter than the containing beaker, and having on the bottom portion of its lateral walls and on its base a series of windows (3) completely covered by a mesh having an opening size of 0.4 millimeters.

A pestle (6) in the shape of a mortar pestle having a cross-section that coincides with the internal cross-section of the filtering beaker.

Means for anchoring the filtering beaker to the containing beaker.

The containing beaker (1) displays a recess on its internal bottom having a suitable shape and dimensions to accommodate tightly the filtering beaker base.

Filtering beaker (2) has a body with a diameter of 7 centimeters.

The filtering beaker has body (4) and a widening at its top portion to the point of reaching the diameter of the containing beaker.

Said widening ends at rim (5) which is appropriate for covering and anchoring the containing beaker mouth, so that in this way both beakers are fixed at their top portions by the action of said rim, and at the bottom of the filtering beaker base it is embedded in the recess in the containing beaker base.

The device comprises pestle (6) in the shape of a mortar pestle, adapted for occupying the cross-section and moving in the interior of the filtering beaker.

The pestle has on the perimeter of its cross-section an o-ring made of flexible material to enable a perfect fit between said pestle and the inner face of the filtering beaker.

The solid elements which will form the basis of the beverage, fruit, vegetables, tiger nuts, dried nuts, are placed in the filtering beaker.

If necessary, a suitable liquid will be placed in the containing beaker to produce the beverage, for example, water to make tiger nut milk (horchata) if desired, or milks for fruit shakes.

Once the ingredients are in the device, a household blender is used for agitating and, as required, crushing the ingredients to obtain extractions of juice which may contain the perfect mixture of the solid ingredients and the liquids.

When the crushing and/or mixing has been finished, the blender is removed and the is introduced, which slides in the interior of the filtering beaker, occupying its section and pushing down to the bottom the solid remnants and drying them by compression against the filter areas.

In order to dry the solid remnants better, it is advisable to raise the base of the filtering beaker above the level of the liquid found in the containing beaker, for which means are available that enable to change the height of the filtering beaker with respect to the containing beaker.

After the liquid has been extracted from the solid remnants, the filtering beaker containing the remnants is removed, and the beverage is served; the assembly has a top to preserve it better.

The containing beaker may have a spout for channeling the outgoing liquid.

The invention claimed is:

1. A device for beverage production by the action of a blending element or system comprising:
a filtering beaker which has a filtering area, a body of the filtering beaker having an open top end and a closed base, the body having an inner diameter of between 4 and 15 centimeters, wherein the filtering area is located on a bottom portion of the lateral walls of the filtering beaker, wherein the filtering area comprises a window covered in its entirety by a mesh having an opening size of between 0.1 and 0.8 millimeters in diameter;
wherein a top portion of the filtering beaker has a widened area such that an end of the widened area is contiguous to a mouth of a container beaker;
a pestle independent from the filtering beaker and configured to be inserted into the open top end of the filtering beaker and occupy a section of said filtering beaker and freely move inside the filtering beaker; and
the filtering area having pores having between 0.1 and 0.8 millimeters in diameter.

2. The device for beverage production in accordance with claim 1, wherein the containing beaker has a larger diameter than that of the filtering beaker and sufficient for accommodating it loosely in its interior.

3. The device for beverage production in accordance with claim 2, wherein at one point of the widened area the filtering beaker has a diameter equal to that of the containing beaker.

4. The device for beverage production in accordance with claim 2, wherein the containing beaker has on its inner bottom complementary geometrical shapes that fix the containing beaker to the filtering beaker.

5. The device for beverage production in accordance with claim 4, wherein a bottom portion of the containing beaker and a bottom portion of the filtering beaker have complementary geometrical shapes including a recess in the containing beaker for tightly fitting with an outer base of the filtering beaker.

6. The device for beverage production in accordance with claim 1, wherein the filtering area is on the closed base of the filtering breaker.

7. The device for beverage production in accordance with claim 1, wherein the filtering area is on lateral walls of the filtering beaker.

8. The device for beverage production in accordance with claim 7, wherein the pores in the filtered area are directly made on the filtering beaker.

9. The device for beverage production in accordance with claim 1, comprising a rim wherein the bottom portion of the rim has a geometry complementary with that of the containing beaker mouth and that is adjusted to the containing beaker mouth.

10. The device for beverage production in accordance with claim 1, wherein the pestle, on an inside of the filtering beaker is configured to carry out an ascending and descending motion.

11. The device for beverage production in accordance with claim 10, wherein the pestle on the inside of the filtering beaker can rotate on its vertical axis.

12. The device for beverage production in accordance with claim 10, wherein a perimeter of a cross-section of the pestle incorporates an O-ring.

13. The device for beverage production in accordance with claim 1, wherein a body of the pestle, when it is supported on a base of the filtering beaker, occupies an interior of said filtering beaker covering a portion of the filtering area.

14. The device for beverage production in accordance with claim 1, wherein the pestle within the filtering beaker comprises a filtering element.

15. The device for beverage production in accordance with claim 1, wherein in between an outer perimeter of the filtering beaker and an inner perimeter of the containing beaker there remains a defined open, free space.

16. The device for beverage production in accordance with claim 1, wherein the pores are between 0.2 and 0.6 millimeters in diameter.

17. The device for beverage production in accordance with claim 1, wherein the pores are between 0.2 and 0.4 millimeters in diameter.

18. The device for beverage production in accordance with claim 1, wherein the filtering beaker has the inner diameter between 6 and 12 centimeters.

19. The device for beverage production in accordance with claim 1, wherein the widening area of the filtering beaker is a rim.

* * * * *